United States Patent
Ji et al.

(10) Patent No.: US 12,411,034 B2
(45) Date of Patent: Sep. 9, 2025

(54) FLOW METER

(71) Applicant: Shanghai Kohler Electronics, Ltd., Shanghai (CN)

(72) Inventors: Yong Ji, Shanghai (CN); Hongfei Mei, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 454 days.

(21) Appl. No.: 18/085,626

(22) Filed: Dec. 21, 2022

(65) Prior Publication Data
US 2023/0204398 A1    Jun. 29, 2023

(30) Foreign Application Priority Data

Dec. 28, 2021    (CN) .......................... 202123345148.3

(51) Int. Cl.
*G01F 1/84*    (2006.01)

(52) U.S. Cl.
CPC .................................. *G01F 1/8413* (2013.01)

(58) Field of Classification Search
CPC ........ G01F 1/8413; G01F 1/053; G01F 15/14; G01F 1/075
See application file for complete search history.

(56) References Cited

U.S. PATENT DOCUMENTS 4,666,061 A * 5/1987 Pluess ...................... G01F 15/14
                                                       285/12

FOREIGN PATENT DOCUMENTS

| AU | 2010326841 A1 | * | 6/2012 | ............. A47J 31/44 |
| CN | 201302497 Y | * | 9/2009 | |
| CN | 202274897 U | | 6/2012 | |
| KR | 101736240 B1 | * | 5/2017 | ............. G01F 15/18 |
| WO | WO-2019098408 A1 | * | 5/2019 | ............. G01F 1/075 |

OTHER PUBLICATIONS

Extended European Search Report from European Patent Application No. 22215961.8, dated May 8, 2023, 11 pages.
Jerry S.J. Chen, "On the design of a wide range mini-flow paddlewheel flow sensor", Apr. 1, 2000, 10 pages, Beverly Technologies, Inc.

* cited by examiner

*Primary Examiner* — Francis C Gray
(74) *Attorney, Agent, or Firm* — Lempia Summerfield Katz LLC

(57) ABSTRACT

A flow meter includes a lower shell flow meter includes: a lower shell; an upper shell disposed on the lower shell; a running water cavity disposed between the lower shell and the upper shell; and an impeller disposed in the running water cavity. The impeller includes: an installation positioning hole disposed at a bottom portion of the impeller; and a rotating positioning hole disposed at a top portion of the impeller. The flow meter includes an installation positioning shaft extending upward from the lower shell and configured to be inserted into the installation positioning hole; and a rotating positioning shaft extending downward from the upper shell and configured to be inserted into the rotating positioning hole.

20 Claims, 10 Drawing Sheets

FLOW METER

CROSS REFERENCE TO RELATED APPLICATION

This application claims the benefit of priority to: Chinese Patent Application No. 202123345148.3 filed in the Chinese Intellectual Property Office on Dec. 28, 2021, which is hereby incorporated by reference in its entirety.

FIELD

The present disclosure relates to the technical field of water flow metering devices, in particular to a flow meter.

BACKGROUND

Flow meters are frequently installed in sanitary products to measure an amount of water flow. Some flow meters are infrared sensor flow meters, and scale generated by the flow meters used for a long time will affect infrared transmitting and receiving light paths. Thus, failure of flow detection may be caused.

In order to overcome the above defects, a flow meter using a Hall sensor is proposed. The flow meter using a Hall sensor comprises a magnet installed on an impeller. Thus, a weight of the impeller is increased, and a friction force between the impeller and a pivotal shaft is increased. Therefore, a higher water flow is required to start rotation. Using a thin pivotal shaft can reduce the friction force between the impeller and the pivotal shaft. However, when upper and lower shells are installed, especially when the upper and lower shells are welded, vibration generated during the installation and welding makes the thin pivotal shaft prone to breakage and thus leads to failure of flow detection.

In light of the above technical problems, it is necessary to provide a novel flow meter.

SUMMARY

The present disclosure aims to provide a novel flow meter to overcome the above shortcomings. When an upper shell and a lower shell are installed, an impeller is positioned through a thick installation positioning shaft. When the impeller floats and rotates, a thin rotating positioning shaft serves as a pivotal shaft of the impeller. Such a configuration not only meets installation requirements, but also realizes an object of reducing a friction force between the impeller and the pivotal shaft, and thus reducing a water flow required when the impeller is started.

The present disclosure provides a flow meter, comprising a lower shell, an upper shell, a Hall sensor, and an impeller provided with a magnet.

The upper shell is installed on the lower shell. The Hall sensor is installed on the upper shell. A running water cavity is provided between the upper shell and the lower shell. The impeller is located in the running water cavity.

A bottom portion of the impeller is provided with an installation positioning hole. A top portion of the impeller is provided with a rotating positioning hole coaxially arranged with the installation positioning hole. A radius of the rotating positioning hole is smaller than a radius of the installation positioning hole.

An installation positioning shaft extends upward from the lower shell. A rotating positioning shaft extends downward from the upper shell. A radius of the rotating positioning shaft is smaller than a radius of the installation positioning shaft.

A gap between the rotating positioning shaft and a hole wall of the rotating positioning hole is smaller than a gap between the installation positioning shaft and a hole wall of the installation positioning hole.

When the impeller is in a falling state, the installation positioning shaft is in clearance fit with the installation positioning hole, and the rotating positioning shaft is suspended above the rotating positioning hole.

When the impeller is in a floating state, the rotating positioning shaft is in clearance fit with the rotating positioning hole, the installation positioning shaft is in clearance fit with the installation positioning hole, and the rotating positioning shaft is a pivotal shaft of the impeller.

In an embodiment, the top portion of the impeller is further provided with a guide hole coaxially arranged with the rotating positioning hole, and the guide hole is located above the rotating positioning hole.

A radius of the guide hole gradually increases in a direction from bottom to top.

When the impeller is in a falling state, a lower end of the rotating positioning shaft is located in the guide hole, and a minimum gap between the rotating positioning shaft and a hole wall of the guide hole is greater than the gap between the installation positioning shaft and the hole wall of the installation positioning hole.

In an embodiment, the rotating positioning shaft is integrally formed with the upper shell.

In an embodiment, the installation positioning shaft is integrally formed with the lower shell.

In an embodiment, the magnet is installed at the top portion of the impeller and located outside the rotating positioning hole.

In an embodiment, the upper shell and the lower shell are welded.

The present disclosure further provides a flow meter, comprising a lower shell, an upper shell, a Hall sensor, and an impeller provided with a magnet.

The upper shell comprises a shell body provided with a top opening and comprises a shell top lid detachably installed on the top opening.

The shell body is installed on the lower shell. The Hall sensor is installed on the upper shell. A running water cavity is provided between the shell body and the lower shell. The impeller is located in the running water cavity.

A bottom portion of the impeller is provided with an installation positioning hole. A top portion of the impeller is provided with a rotating positioning hole coaxially arranged with the installation positioning hole. A radius of the rotating positioning hole is smaller than a radius of the installation positioning hole.

An installation positioning shaft extends upward from the lower shell. A rotating positioning shaft extends downward from the shell top lid. A radius of the rotating positioning shaft is smaller than a radius of the installation positioning shaft.

A gap between the rotating positioning shaft and a hole wall of the rotating positioning hole is smaller than a gap between the installation positioning shaft and a hole wall of the installation positioning hole.

The rotating positioning shaft is in clearance fit with the rotating positioning hole. The installation positioning shaft is in clearance fit with the installation positioning hole. The rotating positioning shaft is a pivotal shaft of the impeller.

In an embodiment, the rotating positioning shaft is integrally formed with the shell top lid.

In an embodiment, the top portion of the impeller is further provided with a guide hole coaxially arranged with the rotating positioning hole, and the guide hole is located above the rotating positioning hole.

A radius of the guide hole gradually increases in a direction from bottom to top.

The rotating positioning shaft is inserted in the rotating positioning hole through the guide hole.

In an embodiment, the shell body and the lower shell are welded.

The flow meter according to the above embodiments can achieve the following beneficial effects.

According to the present disclosure, when the upper shell and the lower shell are installed, the impeller is positioned through the thick installation positioning shaft. When the impeller floats and rotates, the thin rotating positioning shaft serves as a pivotal shaft of the impeller. Such a configuration not only meets installation requirements, but also realizes an object of reducing a friction force between the impeller and the pivotal shaft, and thus reducing a water flow required when the impeller is started.

BRIEF DESCRIPTION OF THE FIGURES

Referring to the drawings, the disclosure of the present disclosure should become easier to understand. It should be understood that the drawings are for the purpose of illustration only and are not intended to limit the protection scope of the present disclosure. In the drawings.

DETAILED DESCRIPTION

Figure 1:
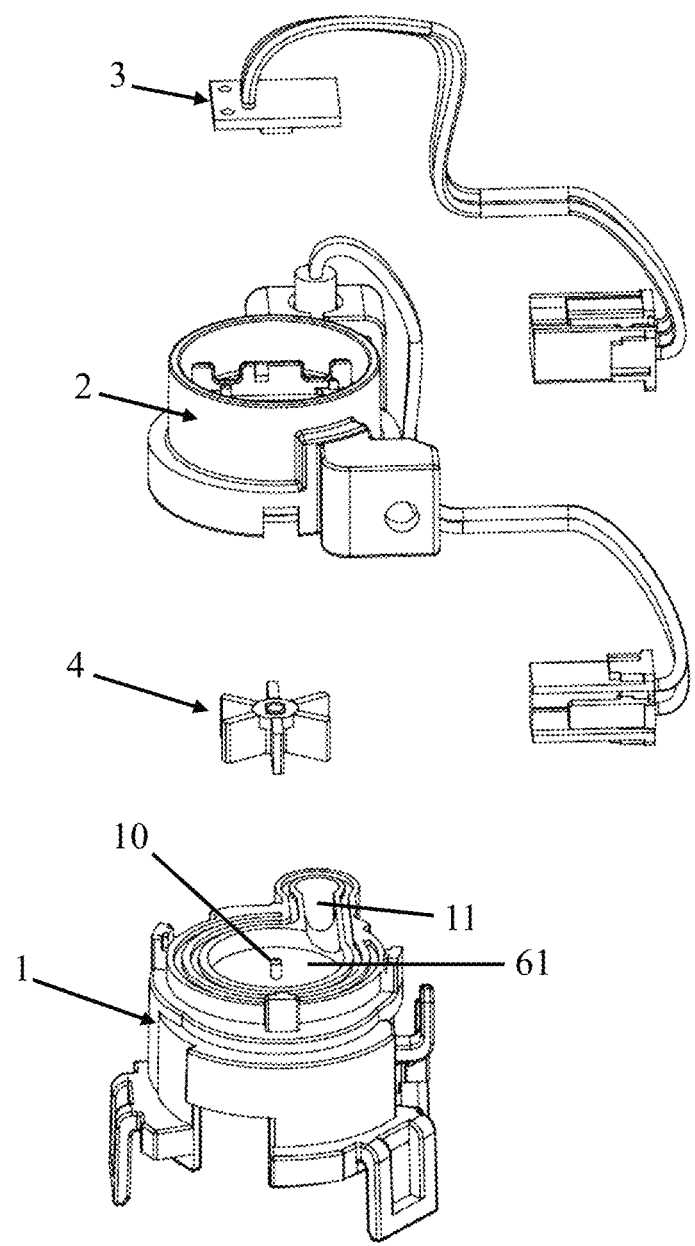
FIG. 1 is an exploded view of a flow meter provided by a first example of the present disclosure.

The specific embodiments of the present disclosure are further described with reference to the drawings hereinafter. Same or equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

A first example and a second example of the present disclosure provide a flow meter. When the flow meter is installed, an impeller 4 is positioned through a thick installation positioning shaft 10. When the impeller 4 floats and rotates, the impeller is positioned through a thin rotating positioning shaft 20, and the thin rotating positioning shaft 20 serves as a pivotal shaft of the impeller 4. Such a configuration not only meets installation requirements, but also realizes an object of reducing a friction force between the impeller 4 and the pivotal shaft, and thus reducing a water flow required when the impeller 4 is started.

An overall structure of the flow meter according to the second example of the present disclosure is basically the same as that according to the first example, except that a specific assembly relationship and installation sequence of an upper shell 2 and the rotating positioning shaft 20 are different.

As shown in FIGS. 1-6, a flow meter according to the first example of the present disclosure comprises a lower shell 1, an upper shell 2, a Hall sensor 3, and an impeller 4 provided with a magnet 5.

The upper shell 2 is installed on the lower shell 1. The Hall sensor 3 is installed on the upper shell 2. A running water cavity 6 is provided between the upper shell 2 and the lower shell 1. The impeller 4 is located in the running water cavity 6.

A bottom portion of the impeller 4 is provided with an installation positioning hole 43. A top portion of the impeller 4 is provided with a rotating positioning hole 44 coaxially arranged with the installation positioning hole 43. A radius of the rotating positioning hole 44 is smaller than a radius of the installation positioning hole 43.

An installation positioning shaft 10 extends upward from the lower shell 1. A rotating positioning shaft 20 extends downward from the upper shell 2. A radius of the rotating positioning shaft 20 is smaller than a radius of the installation positioning shaft 10.

A gap between the rotating positioning shaft 20 and a hole wall of the rotating positioning hole 44 is smaller than a gap between the installation positioning shaft 10 and a hole wall of the installation positioning hole 43.

When the impeller 4 is in a falling or non-floating state, the installation positioning shaft 10 is in clearance fit with the installation positioning hole 43, and the rotating positioning shaft 20 is suspended above the rotating positioning hole 44. The falling or non-floating state may be a state in which the impeller 4 is not floating, e.g., when no sufficient water is supplied to make the impeller 4 float.

When the impeller 4 is in a floating state, the rotating positioning shaft 20 is in clearance fit with the rotating positioning hole 44, the installation positioning shaft 10 is in clearance fit with the installation positioning hole 43, and the rotating positioning shaft 20 is a pivotal shaft of the impeller 4.

In this embodiment, the flow meter mainly comprises the lower shell 1, the upper shell 2, the Hall sensor 3, the impeller 4, and the magnet 5.

The upper shell 2 is installed on the lower shell 1. The running water cavity 6 is formed between the upper shell 2 and the lower shell 1. Accordingly, a bottom surface of the upper shell 2 is provided with a running water cavity upper groove 62, and a top surface of the lower shell 1 is provided with a running water cavity lower groove 61. After the upper shell 2 is installed on the lower shell 1, the running water cavity lower groove 61 is butted with or connected to the running water cavity upper groove 62 to form the running water cavity 6. One side of the running water cavity 6 is provided with a water inlet channel 11, and a bottom portion of the running water cavity 6 is provided with a water outlet channel 12 to realize the circulation of water. The magnet 5 is installed on the impeller 4, and the impeller 4 is installed in the running water cavity 6. The Hall sensor 3 is installed on the upper shell 2. When the impeller 4 rotates, the Hall sensor 3 may monitor a magnetic flux of the magnet 5 and then calculate a rotating speed of the impeller 4 to calculate an amount of water flow. The method of calculating the amount of water flow is not elaborated herein.

In order to meet the installation requirements and reduce the water flow required when the impeller 4 is started, this embodiment is implemented in the following ways:

The bottom portion of the impeller 4 is provided with the installation positioning hole 43. The top portion of the impeller 4 is provided with the rotating positioning hole 44. The rotating positioning hole 44 is coaxially arranged with the installation positioning hole 43. The radius of the rotating positioning hole 44 is smaller than the radius of the installation positioning hole 43.

Accordingly, the installation positioning shaft 10 extending upward is arranged on the top surface of the lower shell 1 facing the running water cavity lower groove 61. The rotating positioning shaft 20 extending downward is arranged on the bottom surface of the upper shell 2 facing the running water cavity upper groove 62. The rotating positioning shaft 20 is coaxially arranged with the installation positioning shaft 10. The radius of the rotating positioning shaft 20 is smaller than the radius of the installation positioning shaft 10.

After assembly, the gap between the rotating positioning shaft 20 and the hole wall of the rotating positioning hole 44 is smaller than the gap between the installation positioning shaft 10 and the hole wall of the installation positioning hole 43, so that when the impeller 4 rotates around the rotating positioning shaft 20, the hole wall of the installation positioning hole 43 of the impeller 4 is basically not in contact with the installation positioning shaft 10. In this case, the installation positioning shaft 10 only plays a role in assisting the rotation of the impeller 4, and a frictional force borne by the impeller 4 mainly comes from the friction between the hole wall of the rotating positioning hole 44 and the rotating positioning shaft 20.

In this embodiment, the upper shell 2 is an integrated shell. When the upper shell 2 and the lower shell 1 are connected and assembled, the impeller 4 is placed in the running water cavity 6, and the installation positioning shaft 10 is inserted into the installation positioning hole 43. The impeller 4 is in the falling or non-floating state (a state in which the impeller 4 is not floating, e.g., when no sufficient water is supplied to make the impeller 4 float) under the action of gravity. The rotating positioning shaft 20 is suspended above the rotating positioning hole 44. In this case, the installation positioning shaft 10 plays a role in limiting a position of the impeller 4. When the upper shell 2 and the lower shell 1 are assembled, the thick installation positioning shaft 10 is stressed, while the thin rotating positioning shaft 20 is not stressed, so that the thin rotating positioning shaft 20 can be effectively prevented from being broken or tilted due to the installation of the upper shell 2 and the lower shell 1.

After installation, when in use, the impeller 4 may float upward after water enters the running water cavity 6. The rotating positioning shaft 20 may be inserted into the rotating positioning hole 44. At this moment, the thin rotating positioning shaft 20 is the pivotal shaft of the impeller 4. Such a configuration can effectively reduce the friction force between the impeller 4 and the pivotal shaft and reduce the water flow required when the impeller 4 is started.

The impeller 4 comprises a central cylinder 41 and a plurality of blades 42 arranged on the central cylinder 41. The installation positioning hole 43 is arranged in a lower half part of the central cylinder 41, and the rotating positioning hole 44 is arranged in an upper half part of the central cylinder 41.

Figure 4:
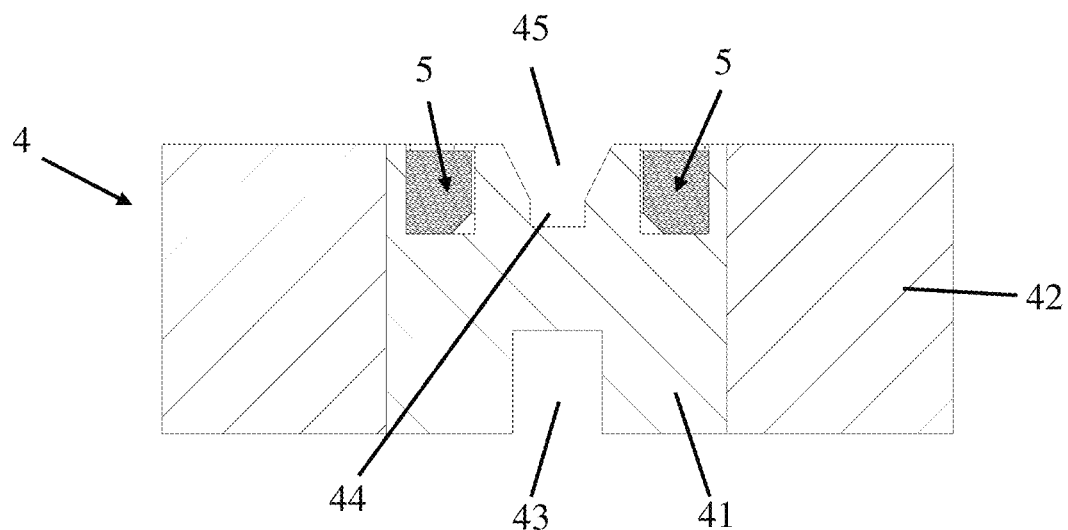
FIG. 4 is a sectional view of an impeller.
Figure 5:
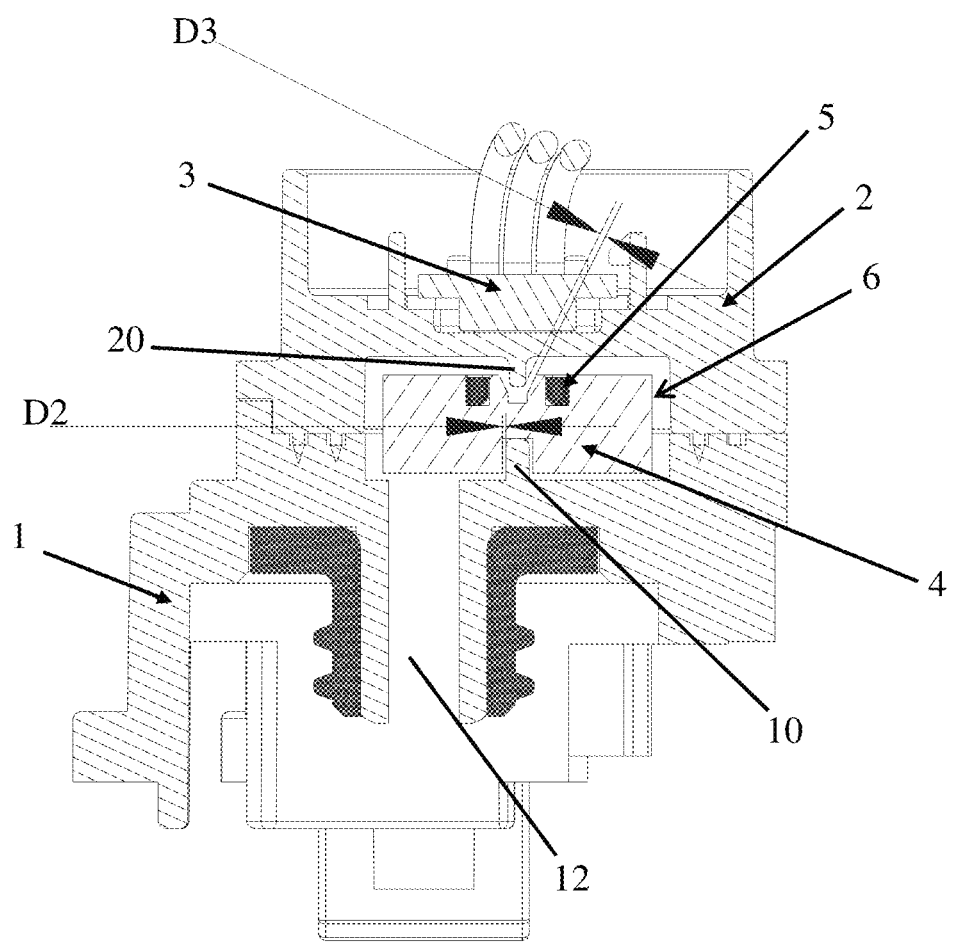
FIG. 5 is a sectional view of the flow meter shown in FIG. 1 when the impeller is in a falling state.
Figure 6:
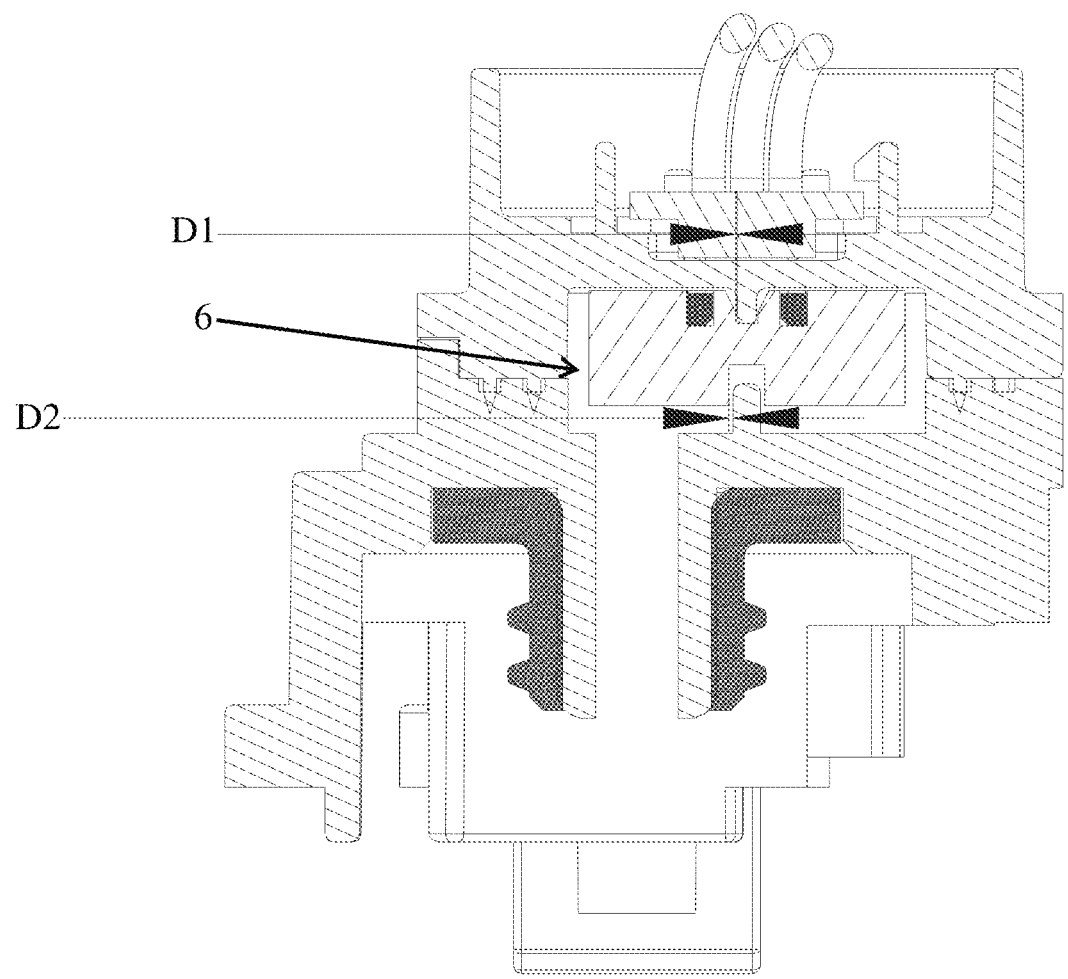
FIG. 6 is a sectional view of the flow meter shown in FIG. 1 when the impeller is in a floating state.

In one embodiment, as shown in FIG. 4, FIG. 5, and FIG. 6, the top portion of the impeller 4 is further provided with a guide hole 45 coaxially arranged with the rotating positioning hole 44, and the guide hole 45 is located above the rotating positioning hole 44.

A radius of the guide hole 45 gradually increases in a direction from a bottom of the guide hole 45 to a top of the guide hole 45.

When the impeller 4 is in a falling state, a lower end of the rotating positioning shaft 20 is located in the guide hole 45, and a minimum gap between the rotating positioning shaft 20 and a hole wall of the guide hole 45 is greater than the gap between the installation positioning shaft 10 and the hole wall of the installation positioning hole 43.

In this embodiment, the guide hole 45 is arranged above the rotating positioning hole 44, and the guide hole 45 is funnel-shaped, which is wide in upper and narrow in lower.

When the upper shell 2 and the lower shell 1 are installed, the impeller 4 falls on the lower shell 1, the lower end of the rotating positioning shaft 20 is located in the guide hole 45, and the minimum gap between the rotating positioning shaft 20 and the hole wall of the guide hole 45 is greater than the gap between the installation positioning shaft 10 and the hole wall of the installation positioning hole 43. Such a configuration can ensure that the vibration during installation may not be transmitted to the rotating positioning shaft 20. When water enters the running water cavity 6, the impeller 4 floats upward, and the guide hole 45 plays a guiding role, so that the rotating positioning shaft 20 can be smoothly inserted into the rotating positioning hole 44.

In one embodiment, the rotating positioning shaft 20 is integrally formed with the upper shell 2. Both the rotating positioning shaft 20 and the upper shell 2 are plastic parts that may be integrally molded by injection molding. This is convenient for processing and molding, and the connection stability between the rotating positioning shaft 20 and the upper shell 2 is high.

In one embodiment, the installation positioning shaft 10 is integrally formed with the lower shell 1. Both the installation positioning shaft 10 and the lower shell 1 are plastic parts that may be integrally molded by injection molding. This is convenient for processing and molding, and the connection stability between the installation positioning shaft 10 and the lower shell 1 is high.

In one embodiment, as shown in FIG. 4, the magnet 5 is installed at the top portion of the impeller 4 and located outside the rotating positioning hole 44 and is close to the Hall sensor 3. This is convenient for the Hall sensor 3 to monitor a magnetic flux. The induction monitoring method of the Hall sensor 3 and the magnet 5 and the number of the magnet 5 are not elaborated herein.

In one embodiment, the upper shell 2 and the lower shell 1 are welded, and the connecting structure is stable. This is beneficial to simplify the connecting structure of the upper shell 2 and the lower shell 1 and reduce the size of the product.

Figure 2:
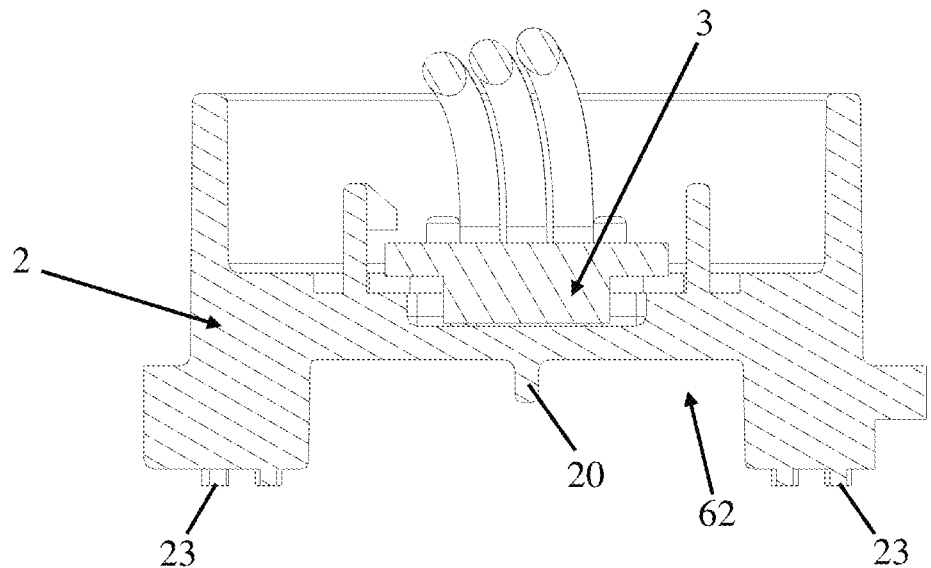
FIG. 2 is a sectional view of an upper shell shown in FIG. 1.
Figure 3:
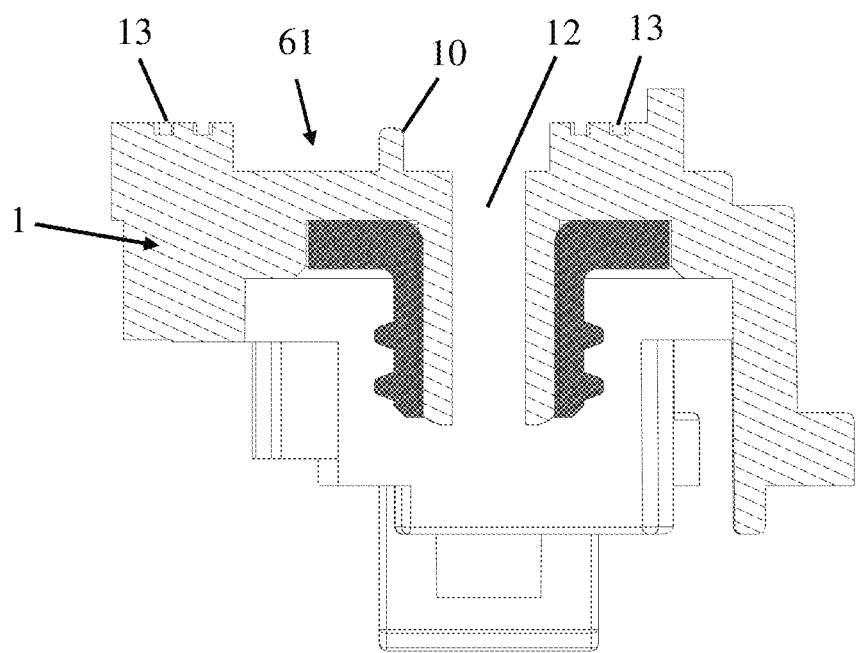
FIG. 3 is a sectional view of a lower shell shown in FIG. 1.

In one embodiment, as shown in FIG. 2 and FIG. 3, the bottom surface of the upper shell 2 is provided with a positioning bulge 23, and the top surface of the lower shell 1 is provided with a positioning groove 13. During assembly, the positioning bulge 23 fits into the positioning groove 13 to facilitate the assembly of the upper shell 2 and the lower shell 1.

Figure 7:
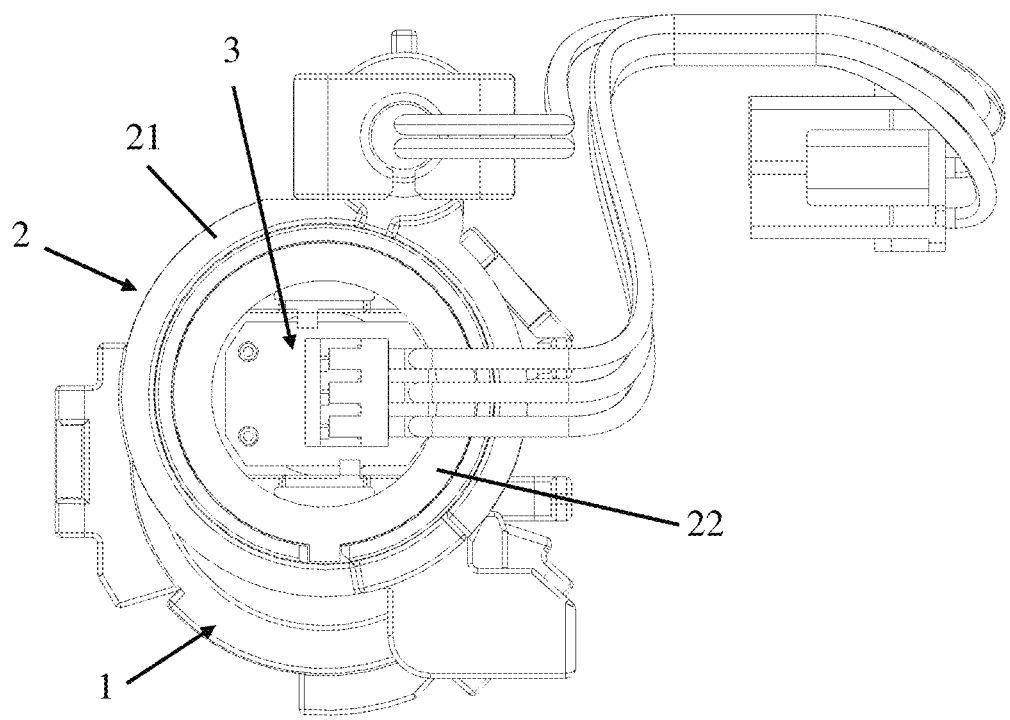
FIG. 7 is a top view of a flow meter provided by a second example of the present disclosure.
Figure 8:
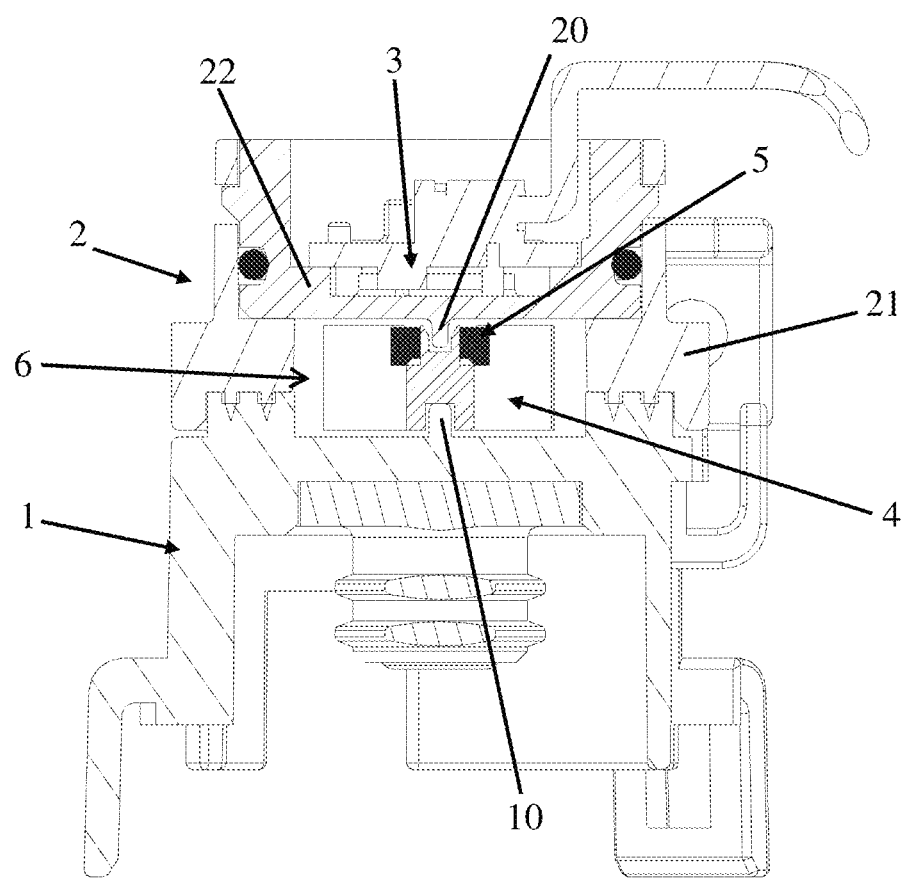
FIG. 8 is a sectional view of the flow meter shown in FIG. 7.
Figure 9:
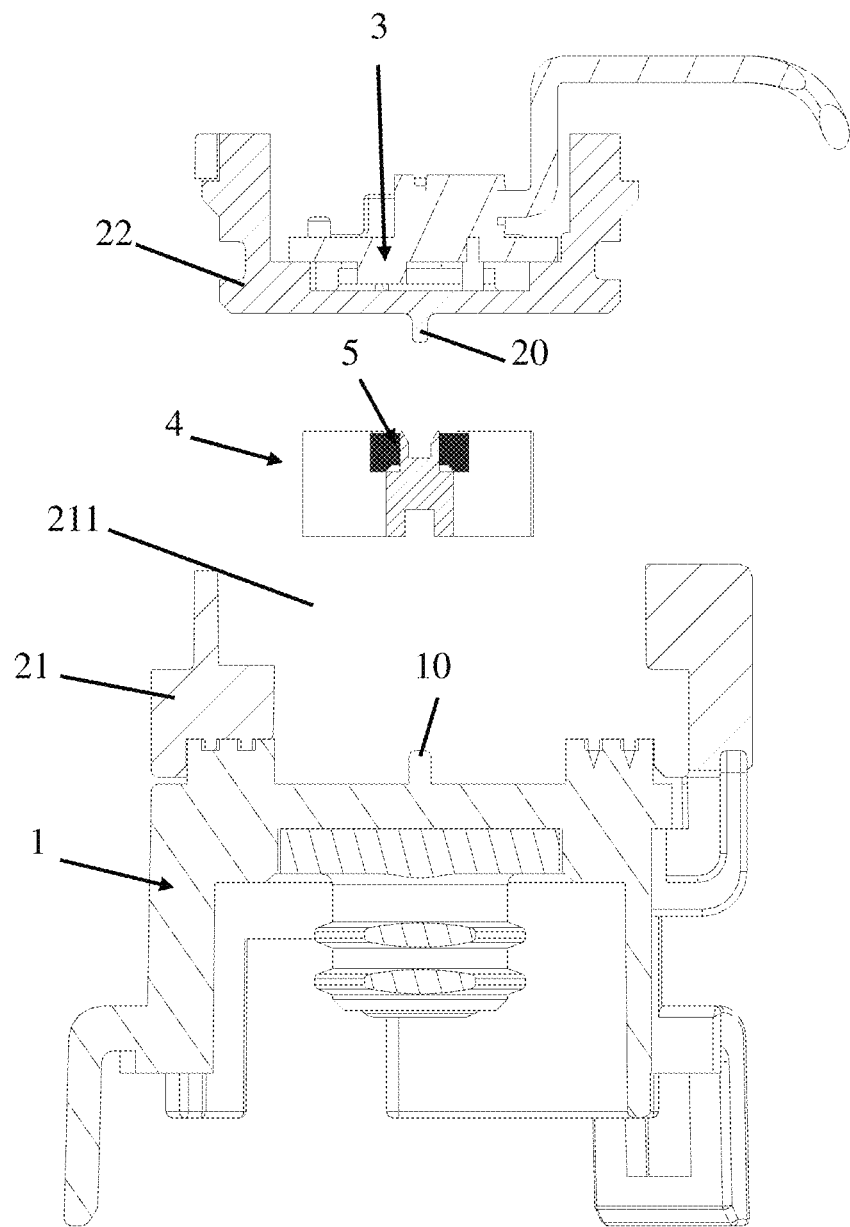
FIG. 9 is an exploded view of the flow meter shown in FIG. 8.

As shown in FIG. 7, FIG. 8, and FIG. 9, a flow meter according to the second example of the present disclosure comprises a lower shell 1, an upper shell 2, a Hall sensor 3, and an impeller 4 provided with a magnet 5.

The upper shell 2 comprises a shell body 21 provided with a top opening 211 and a shell top lid 22 detachably installed on the top opening 211.

The shell body 21 is installed on the lower shell 1. The Hall sensor 3 is installed on the upper shell 2. A running water cavity 6 is provided between the shell body 21 and the lower shell 1. The impeller 4 is located in the running water cavity 6.

A bottom portion of the impeller 4 is provided with an installation positioning hole 43. A top portion of the impeller 4 is provided with a rotating positioning hole 44 coaxially arranged with the installation positioning hole 43. A radius of the rotating positioning hole 44 is smaller than a radius of the installation positioning hole 43.

An installation positioning shaft 10 extends upward from the lower shell 1. A rotating positioning shaft 20 extends downward from the shell top lid 22. A radius of the rotating positioning shaft 20 is smaller than a radius of the installation positioning shaft 10.

A gap between the rotating positioning shaft 20 and a hole wall of the rotating positioning hole 44 is smaller than a gap between the installation positioning shaft 10 and a hole wall of the installation positioning hole 43.

The rotating positioning shaft 20 is in clearance fit with the rotating positioning hole 44. The installation positioning shaft 10 is in clearance fit with the installation positioning hole 43. The rotating positioning shaft 20 is a pivotal shaft of the impeller 4.

The flow meter according to the second example of the present disclosure comprises the lower shell 1, the upper shell 2, the Hall sensor 3, the impeller 4, and the magnet 5.

Structures of the lower shell 1, the Hall sensor 3, the impeller 4, and the magnet 5 are the same as those of the lower shell 1, the Hall sensor 3, the impeller 4 and the magnet 5 in the first example. Thus, the structures are not elaborated herein.

In this embodiment, the upper shell 2 has a split structure, which comprises the shell body 21 and the shell top lid 22. A top portion of the shell body is provided with the top opening 211 and the shell top lid 22 is detachably installed on the top opening 211. The shell body 21 is connected with the lower shell 1, and the running water cavity 6 is provided among the lower shell 1, the shell body 21 and the shell top lid 22. The Hall sensor 3 is installed on the upper shell 2, and the rotating positioning shaft 20 is arranged on a bottom surface of the shell top lid 22 facing the running water cavity 6.

During installation, the impeller 4 is placed in the running water cavity 6, and the installation positioning shaft 10 is inserted into the installation positioning hole 43 of the impeller 4, and then the shell body 21 is connected with the lower shell 1. Then, the shell top lid 22 integrated with the Hall sensor 3 is installed on the top opening 211, and the rotating positioning shaft 20 is inserted into the rotating positioning hole 44. When the shell body 21 is connected with the lower shell 1, the rotating positioning shaft 20 is not assembled yet, so the installation of the shell body 21 and the lower shell 1 may not affect the rotating positioning shaft 20. When in use, the impeller 4 may float upward after water enters the running water cavity 6, and at this moment, the thin rotating positioning shaft 20 serves as a pivotal shaft of the impeller 4. Such a configuration can effectively reduce a friction force between the impeller 4 and the pivotal shaft and reduce a water flow required when the impeller 4 is started.

The shell top lid 22 may be connected with the shell body 21 by screws, snap-fit structures, screw structures, or the like. If needed, a sealing ring may be arranged between the shell body 21 and the shell top lid 22.

In one embodiment, the rotating positioning shaft 20 is integrally formed with the shell top lid 22. Both the rotating positioning shaft 20 and the shell top lid 22 are plastic parts that may be integrally molded by injection molding, which is convenient for processing and molding, and the connection stability between the rotating positioning shaft 20 and the shell top lid 22 is high.

In one embodiment, as shown in FIG. 4, FIG. 8, and FIG. 9, the top portion of the impeller 4 is further provided with a guide hole 45 coaxially arranged with the rotating positioning hole 44, and the guide hole 45 is located above the rotating positioning hole 44.

A radius of the guide hole 45 gradually increases in a direction from a bottom of the guide hole 45 to a top of the guide hole 45.

The rotating positioning shaft 20 is inserted into the rotating positioning hole 44 through the guide hole 45.

In this embodiment, the guide hole 45 is arranged above the rotating positioning hole 44. The guide hole 45 is funnel-shaped that is wide in upper and narrow in lower. This is advantageous for guiding the rotating positioning shaft 20 to be inserted into the rotating positioning hole 44.

In one embodiment, the shell body 21 and the lower shell 1 are welded, and the connecting structure is stable. This is beneficial to simplify the connecting structure of the shell body 21 and the lower shell 1 and reduce the size of the product.

Figure 10:
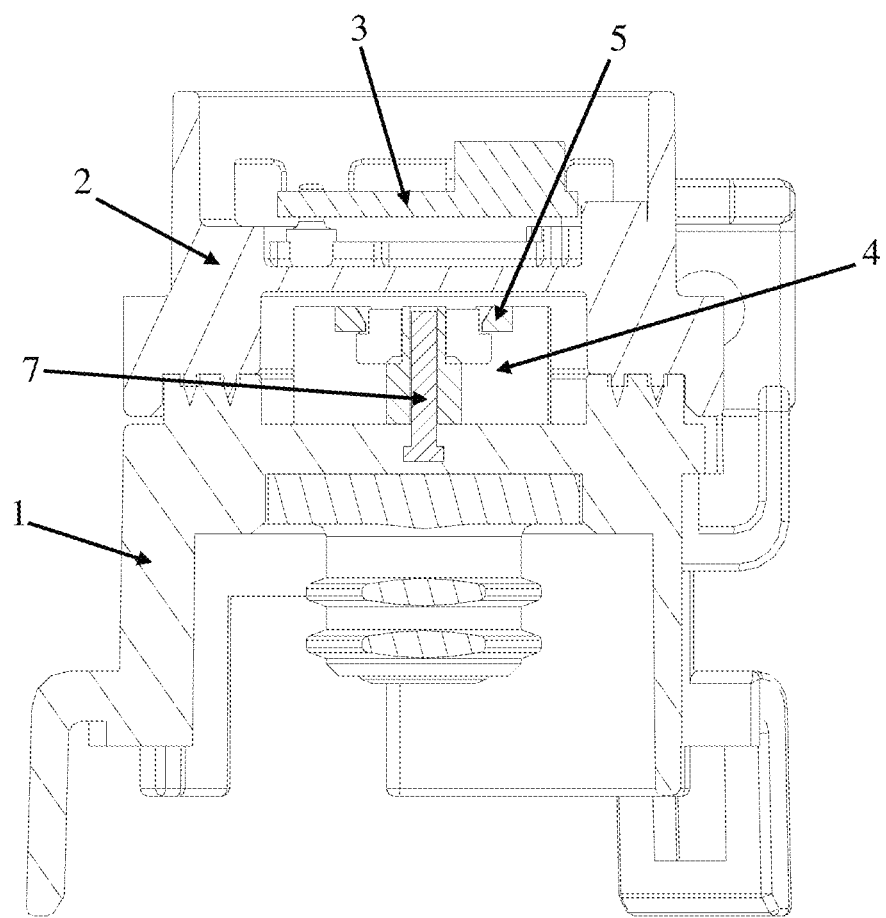
FIG. 10 is a sectional view of a flow meter provided by a third example of the present disclosure.

As shown in FIG. 10, according to a flow meter according to a third example of the present disclosure, a metal shaft 7 is directly injection-molded onto a lower shell 1 to install an impeller 4. Such a configuration can reduce a radius of the metal shaft 7 and prevent the metal shaft 7 from being broken during installation.

An embodiment of the present disclosure provides a toilet comprising the flow meter according to any embodiments as described above.

In an embodiment, the toilet includes a base (e.g., a pedestal, bowl, etc.) and a tank. The base is configured to be attached to another object such as a drainpipe, floor, or another suitable object. The base includes a bowl, a sump (e.g., a receptacle) disposed below the bowl, and a trapway fluidly connecting the bowl to a drainpipe or sewage line. The tank may be supported by the base, such as an upper surface of a rim. The tank may be integrally formed with the base as a single unitary body. In other embodiments, the tank may be formed separately from the base and coupled (e.g., attached, secured, fastened, connected, etc.) to the base. The toilet may further include a tank lid covering an opening and inner cavity in the tank. The toilet may include a seat assembly including a seat and a seat cover rotatably coupled to the base. The toilet may further include a hinge assembly.

In another embodiment, the toilet may be a tankless toilet. The toilet includes a base and a seat assembly coupled to the base. The base includes a bowl, a sump disposed below the bowl, and a trapway fluidly connecting the bowl to a drainpipe or sewage line. The toilet includes a waterline that supplies the toilet with water. The toilet may further include a seat assembly including a seat and a seat cover rotatably coupled to the base. The toilets described above are provided herein as non-limiting examples of toilets that may be configured to utilize aspects of the present disclosure.

In some examples, the bidet may be included in a seat or pedestal of a toilet. In other examples, the bidet may be manufactured separately from and attached or coupled to a seat or pedestal of a toilet. The bidet includes a housing. The housing is configured to receive a flow of water through a housing inlet and dispense the flow of water from a housing outlet. The housing inlet and housing outlet may be located on opposite ends of the housing from one another, such that water may flow through the housing from the housing inlet to the housing outlet. In some examples, the housing further includes a chamber. As the housing receives the flow of water, the chamber may fill with water and provide a flow of water between the housing inlet and the housing outlet. The chamber may be configured to contain the flow of water and direct the flow of water from the housing inlet to the housing outlet. After the chamber has filled with water, the flow of water may travel along a substantially linear path between the housing inlet and the housing outlet. In some examples, one or more walls within the housing may be included to help direct a flow of water between the housing inlet and the housing outlet. The bidet may further include a housing inlet conduit configured to direct a flow of water to the housing inlet. The housing inlet conduit may be coupled to a water supply such as tank or waterline. The housing may further include a gear assembly or a portion of the gear assembly.

Figure 11:
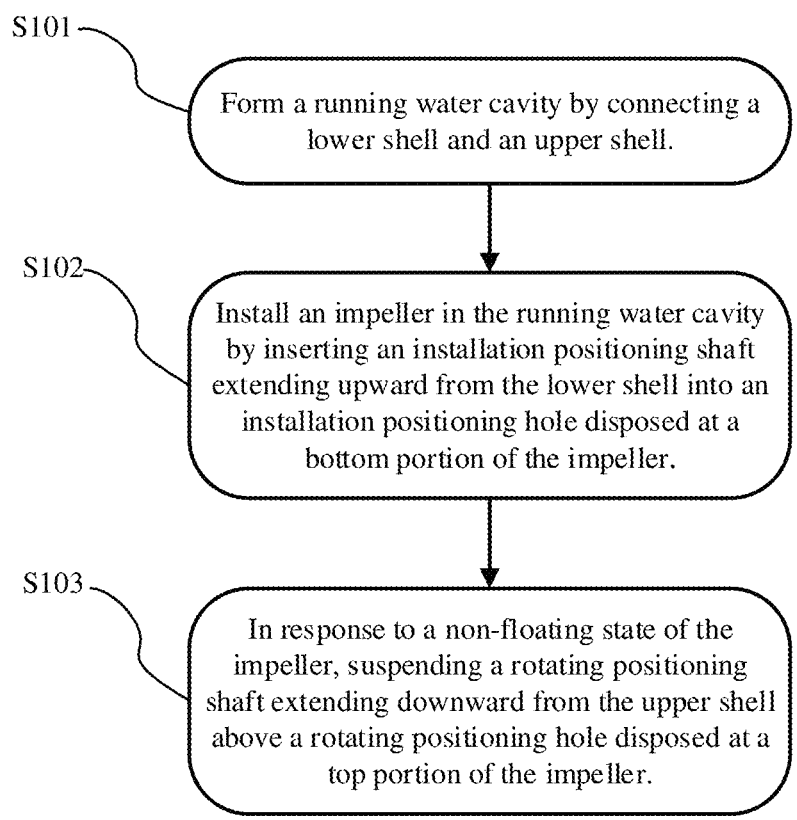
FIG. 11 is a flow chart of a method for assembling a flow meter according to an example of the present disclosure.

FIG. 11 is a flow chart of a method for assembling a flow meter according to an example of the present disclosure. The flow meter assembled by the method may be the flow meter according to the above examples of the present disclosure and may be configured to perform an operation, function, or the like as described in the present disclosure.

At act S101, a user may form the running water cavity 6 by connecting the lower shell 1 and the upper shell 2. As noted above, the upper shell 2 is installed on the lower shell 1. The running water cavity 6 is formed between the upper shell 2 and the lower shell 1. Accordingly, a bottom surface of the upper shell 2 is provided with a running water cavity upper groove 62, and a top surface of the lower shell 1 is provided with a running water cavity lower groove 61. After the upper shell 2 is installed on the lower shell 1, the running water cavity lower groove 61 is butted with or connected to the running water cavity upper groove 62 to form the running water cavity 6.

At act S102, the user may install the impeller 4 in the running water cavity 6 by inserting the installation positioning shaft 10 extending upward from the lower shell 1 into the installation positioning hole 43 disposed at the bottom portion of the impeller 4. As noted above, when the upper shell 2 and the lower shell 1 are connected and assembled, the impeller 4 is placed in the running water cavity 6, and the installation positioning shaft 10 is inserted into the installation positioning hole 43. The impeller 4 is in the falling or non-floating state under the action of gravity.

At act S103, the non-floating state of the impeller suspends the rotating positioning shaft 20 extending downward from the upper shell 2 above the rotating positioning hole 44 disposed at the top portion of the impeller 4. As noted above, when the impeller 4 is in the falling or non-floating state under the action of gravity, the rotating positioning shaft 20 is suspended above the rotating positioning hole 44. In this case, the installation positioning shaft 10 plays a role in limiting a position of the impeller 4. When the upper shell 2 and the lower shell 1 are assembled, the thick installation positioning shaft 10 is stressed, while the thin rotating positioning shaft 20 is not stressed, so that the thin rotating positioning shaft 20 can be effectively prevented from being broken or tilted due to the installation of the upper shell 2 and the lower shell 1.

The radius of the rotating positioning hole 44 is smaller than the radius of the installation positioning hole 43. The radius of the rotating positioning shaft 20 is smaller than the radius of the installation positioning shaft 10.

Figure 12:
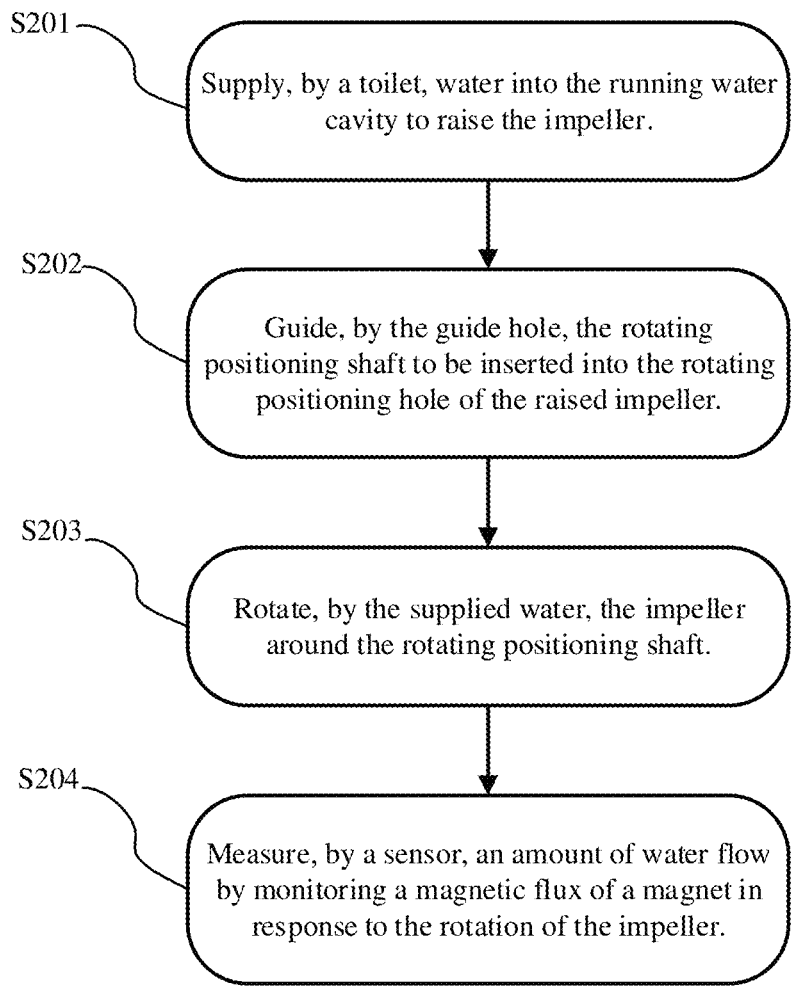
FIG. 12 is a flow chart of a method for measuring water flow by using an impeller according to an example of the present disclosure.

FIG. 12 is a flow chart of a method for measuring water flow by using an impeller according to an example of the present disclosure. The flow meter used by the method may be the flow meter according to the above examples of the present disclosure and may be configured to perform an operation, function, or the like as described in the present disclosure.

At act S201, a toilet may supply water into the running water cavity 6 to raise the impeller 4. As noted above, when the water enters the running water cavity 6, the impeller 4 may float upward. Thus, the impeller 4 may be in the floating state.

At act S202, the guide hole 45 guides the rotating positioning shaft 20 to be inserted into the rotating positioning hole 44 of the raised impeller 4. As noted above, the guide hole 45 may play a guiding role, so that the rotating positioning shaft 20 can be smoothly inserted into the rotating positioning hole 44.

At act S203, the supplied water rotates the impeller 4 around the rotating positioning shaft 20. As noted above, when the rotating positioning shaft 20 is inserted into the rotating positioning hole 44 of the raised impeller 4, the rotating positioning shaft 20 may serve as the pivotal shaft of the impeller 4.

At act S204, the Hall sensor 3 measure an amount of the water flow by monitoring a magnetic flux of the magnet 5 in response to the rotation of the impeller 4. As noted above, the Hall sensor 3 is installed on the upper shell 2. When the impeller 4 rotates, the Hall sensor 3 may monitor a magnetic flux of the magnet 5 and then calculate a rotating speed of the impeller 4 to measure the water flow.

According to needs, the above technical solutions may be combined to achieve the best technical effect.

The above only describes the principles and the embodiments of the present disclosure. It should be pointed out that for those of ordinary skill in the art, other variations can be made based on the principle of the present disclosure and should also be regarded as falling within the scope of protection of the present disclosure.

We claim:

1. A flow meter, comprising:
a lower shell;
an upper shell disposed on the lower shell;
a running water cavity disposed between the lower shell and the upper shell;
an impeller disposed in the running water cavity, the impeller comprising:
an installation positioning hole disposed at a bottom portion of the impeller; and
a rotating positioning hole disposed at a top portion of the impeller;
an installation positioning shaft extending upward from the lower shell and configured to be inserted into the installation positioning hole; and
a rotating positioning shaft extending downward from the upper shell and configured to be inserted into the rotating positioning hole.

2. The flow meter according to claim 1,
wherein a radius of the rotating positioning hole is smaller than a radius of the installation positioning hole, and
wherein a radius of the rotating positioning shaft is smaller than a radius of the installation positioning shaft.

3. The flow meter according to claim 1,
wherein a gap between the rotating positioning shaft and a hole wall of the rotating positioning hole is smaller than a gap between the installation positioning shaft and a hole wall of the installation positioning hole.

4. The flow meter according to claim 1,
wherein when the impeller is in a non-floating state, the installation positioning shaft is in clearance fit with the installation positioning hole, and the rotating positioning shaft suspends above the rotating positioning hole, and
wherein when the impeller is in a floating state, the rotating positioning shaft is in clearance fit with the rotating positioning hole, the installation positioning shaft is in clearance fit with the installation positioning hole, and the rotating positioning shaft is a pivotal shaft of the impeller.

5. The flow meter according to claim 1,
wherein the rotating positioning hole is coaxially arranged with the installation positioning hole.

6. The flow meter according to claim 4, further comprising:
a guide hole disposed at the top portion of the impeller and coaxially arranged with the rotating positioning hole,
wherein the guide hole is disposed above the rotating positioning hole,
wherein a radius of the guide hole gradually increases in a direction from a bottom of the guide hole to a top of the guide hole, and
wherein when the impeller is in the non-floating state, a lower end of the rotating positioning shaft is disposed in the guide hole, and a minimum gap between the rotating positioning shaft and a hole wall of the guide hole is greater than the gap between the installation positioning shaft and the hole wall of the installation positioning hole.

7. The flow meter according to claim 1,
wherein the impeller comprises a central cylinder and a plurality of blades disposed on the central cylinder,
wherein the installation positioning hole is disposed in a lower portion of the central cylinder, and
wherein the rotating positioning hole is disposed in an upper part of the central cylinder.

8. The flow meter according to claim 1,
wherein the rotating positioning shaft is integrally formed with the upper shell, and
wherein the installation positioning shaft is integrally formed with the lower shell.

9. The flow meter according to claim 1,
wherein a magnet is disposed at the top portion of the impeller and disposed outside the rotating positioning hole.

10. The flow meter according to claim 9,
wherein the upper shell and the lower shell are welded or connected via a positioning bulge of the upper shell and a positioning groove of the lower shell,
wherein a sensor disposed on the upper shell and configured to measure an amount of water flow by monitoring a magnetic flux of the magnet.

11. A flow meter, comprising:
a lower shell;
an upper shell comprising:
a shell body disposed on the lower shell, the shell body comprising a top opening; and
a shell top lid detachably disposed on the top opening;
a running water cavity disposed between the shell body and the lower shell;
an impeller disposed in the running water cavity, the impeller comprising:
an installation positioning hole disposed at a bottom portion of the impeller; and
a rotating positioning hole disposed at a top portion of the impeller and coaxially arranged with the installation positioning hole;
an installation positioning shaft extending upward from the lower shell and configured to be inserted into the installation positioning hole; and
a rotating positioning shaft extending downward from the shell top lid and configured to be inserted into the rotating positioning hole.

12. The flow meter according to claim 11,
wherein a radius of the rotating positioning hole is smaller than a radius of the installation positioning hole, and
wherein a radius of the rotating positioning shaft is smaller than a radius of the installation positioning shaft.

13. The flow meter according to claim 11,
wherein a gap between the rotating positioning shaft and a hole wall of the rotating positioning hole is smaller than a gap between the installation positioning shaft and a hole wall of the installation positioning hole.

14. The flow meter according to claim 11,
wherein the rotating positioning shaft is in clearance fit with the rotating positioning hole,
wherein the installation positioning shaft is in clearance fit with the installation positioning hole, and
wherein the rotating positioning shaft is a pivotal shaft of the impeller when water is supplied into the running water cavity to raise and rotate the impeller.

15. The flow meter according to claim 11,
wherein a guide hole is disposed at the top portion of the impeller and coaxially arranged with the rotating positioning hole,
wherein the guide hole is disposed above the rotating positioning hole,
wherein a radius of the guide hole gradually increases in a direction from a bottom of the guide hole to a top of the guide hole, and
wherein the rotating positioning shaft is inserted into the rotating positioning hole through the guide hole.

16. The flow meter according to claim 9, further comprising:
a magnet disposed at the top portion of the impeller; and
a sensor disposed on the upper shell and configured to measure an amount of water flow by monitoring a magnetic flux of the magnet.

17. A method for assembling a flow meter, the method comprising:
forming a running water cavity by connecting a lower shell and an upper shell;
installing an impeller in the running water cavity by inserting an installation positioning shaft extending upward from the lower shell into an installation positioning hole disposed at a bottom portion of the impeller; and in response to a non-floating state of the impeller, suspending a rotating positioning shaft extending downward from the upper shell above a rotating positioning hole disposed at a top portion of the impeller, wherein a radius of the rotating positioning hole is smaller than a radius of the installation positioning hole, and wherein a radius of the rotating positioning shaft is smaller than a radius of the installation positioning shaft.

18. The method according to claim 17, further comprising supplying water into the running water cavity;

raising and rotating, by the water, the impeller so that the rotating positioning shaft is in clearance fit with the rotating positioning hole, the installation positioning shaft is in clearance fit with the installation positioning hole, and the impeller rotates around the rotating positioning shaft, wherein a gap between the rotating positioning shaft and a hole wall of the rotating positioning hole is smaller than a gap between the installation positioning shaft and a hole wall of the installation positioning hole.

19. The method according to claim 17, further comprising:

in response to the non-floating state of the impeller, inserting a lower end of the rotating positioning shaft into a guide hole disposed at the top portion of the impeller and disposed above the rotating positioning hole, wherein a radius of the guide hole gradually increases in a direction from a bottom of the guide hole to a top of the guide hole, and wherein in response to the non-floating state of the impeller, a lower end of the rotating positioning shaft is disposed in the guide hole, and a minimum gap between the rotating positioning shaft and a hole wall of the guide hole is greater than the gap between the installation positioning shaft and the hole wall of the installation positioning hole.

20. The method according to claim 19, further comprising:

guiding, by the guide hole, the rotating positioning shaft to be inserted into the rotating positioning hole when supplying the water into the running water cavity.

* * * * *